United States Patent
Lee et al.

(10) Patent No.: US 11,097,656 B2
(45) Date of Patent: **\*Aug. 24, 2021**

(54) LIGHTING APPARATUS OF AUTONOMOUS VEHICLE

(71) Applicant: HYUNDAI MOBIS CO., LTD., Seoul (KR)

(72) Inventors: Eun Jeong Lee, Yongin-si (KR); Seung Woo Baek, Yongin-si (KR); Ban Suk Choi, Yongin-si (KR); Cheon Seop Shin, Yongin-si (KR); Jun Hyuk Cha, Yongin-si (KR); Moo Kwan Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,566

(22) Filed: May 8, 2020

(65) Prior Publication Data
US 2020/0269752 A1    Aug. 27, 2020

Related U.S. Application Data

(63) Continuation of application No. 16/235,552, filed on Dec. 28, 2018, now Pat. No. 10,682,950.

(30) Foreign Application Priority Data

Nov. 16, 2018    (KR) .................. 10-2018-0141619

(51) Int. Cl.
*B60Q 1/22*    (2006.01)
*B60Q 1/50*    (2006.01)
(Continued)

(52) U.S. Cl.
CPC ............. *B60Q 1/50* (2013.01); *B60Q 1/2615* (2013.01); *G01S 7/4808* (2013.01); *G01S 17/931* (2020.01)

(58) Field of Classification Search
CPC ....... B60Q 1/50; B60Q 1/2615; G01S 17/931; G01S 7/4808
(Continued)

(56) References Cited

U.S. PATENT DOCUMENTS 5,801,620 A * 9/1998 Ready .................. B60Q 1/2611
340/438
9,855,890 B2 * 1/2018 James .................... B60Q 1/525
(Continued)

FOREIGN PATENT DOCUMENTS

EP        3357754 A1    8/2018
EP        3369622 A1    9/2018
KR   10-2012-0072020 A    7/2012

OTHER PUBLICATIONS

Partial European Search Report of corresponding European Application No. 18248162.2—13 pages (dated Sep. 13, 2019).

*Primary Examiner* — Zhen Y Wu
(74) *Attorney, Agent, or Firm* — NSIP Law

(57) ABSTRACT

A lighting apparatus of an autonomous vehicle may include: a roof formed at the top of a vehicle; a lighting unit installed on the roof, and configured to display an autonomous driving status of the vehicle to the outside; and a control unit configured to vary a lighting status of the lighting unit according to the autonomous driving status of the vehicle.

13 Claims, 6 Drawing Sheets

(51) Int. Cl.
*G01S 17/931* (2020.01)
*B60Q 1/26* (2006.01)
*G01S 7/48* (2006.01)

(58) Field of Classification Search
USPC ........................................................ 340/463
See application file for complete search history.

(56) References Cited

U.S. PATENT DOCUMENTS

| | | | | |
|---|---|---|---|---|
| 2004/0239151 | A1* | 12/2004 | Czinki | B60R 13/025 |
| | | | | 296/214 |
| 2005/0237219 | A1* | 10/2005 | Pederson | B60Q 1/2611 |
| | | | | 340/815.45 |
| 2011/0022284 | A1* | 1/2011 | Umakoshi | B60W 30/16 |
| | | | | 701/70 |
| 2011/0267833 | A1* | 11/2011 | Verrat-Debailleul | |
| | | | | B60Q 3/208 |
| | | | | 362/545 |
| 2012/0320621 | A1* | 12/2012 | Kleo | B32B 17/10018 |
| | | | | 362/558 |
| 2015/0035437 | A1* | 2/2015 | Panopoulos | B60L 53/12 |
| | | | | 315/112 |
| 2015/0232019 | A1* | 8/2015 | Salter | B60Q 1/2696 |
| | | | | 362/510 |
| 2016/0243982 | A1* | 8/2016 | Ruffner | B60Q 1/2611 |
| 2017/0240098 | A1* | 8/2017 | Sweeney | B60Q 1/50 |
| 2017/0282784 | A1* | 10/2017 | Foster | A01B 76/00 |
| 2018/0037268 | A1* | 2/2018 | Moore | G01S 17/931 |
| 2018/0154822 | A1* | 6/2018 | Salter | H05B 45/10 |
| 2018/0182186 | A1* | 6/2018 | Yang | B60Q 1/50 |
| 2018/0228004 | A1* | 8/2018 | Masuda | F21S 41/00 |
| 2019/0248421 | A1* | 8/2019 | Jacobsthal | B60Q 1/50 |
| 2019/0384321 | A1* | 12/2019 | Nishi | G05D 1/0278 |
| 2020/0183328 | A1* | 6/2020 | Studeny | B60Q 1/302 |
| 2021/0078486 | A1* | 3/2021 | Sugiyama | F21S 41/645 |

* cited by examiner

LIGHTING APPARATUS OF AUTONOMOUS VEHICLE

CROSS-REFERENCES TO RELATED APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

The present invention relates to a lighting apparatus of an autonomous vehicle, and more particularly, to a lighting apparatus of an autonomous vehicle, which can enable a pedestrian and another vehicle to recognize a driving status of the autonomous vehicle.

In general, autonomous driving technology is divided into five levels. Autonomous driving level 0 indicates that a human driver directly controls all tasks required for driving, and corresponds to a vehicle which is not related to the autonomous driving technology. Autonomous driving level 1 indicates that a human driver selectively controls the speed and direction of a vehicle using cameras and sensors such as a cruise control system, lane departure warning system and collision warning system. Autonomous driving level 2 indicates that a vehicle travels by itself in a specific situation and adjusts speed to maintain a distance from a vehicle in front.

Autonomous driving level 3 indicates that intervention of a human driver is further reduced and a vehicle can sense and avoid an obstacle by itself or bypass a road when the vehicle is stuck in traffic. Autonomous driving level 4 indicates that a human driver may only set a destination and a system of a vehicle monitors the entire driving section and performs safety-related functions by itself. Autonomous driving level 5 corresponds to an autonomous vehicle which moves without a human driver.

A vehicle accident may be prevented when a pedestrian recognizes a vehicle around the pedestrian and avoids the vehicle, or prevented by the forward looking ability or steering ability of a vehicle driver. However, since the intervention of a driver is significantly reduced during autonomous driving of a vehicle, a technique for allowing a pedestrian to recognize the operation status of the vehicle more clearly is required to secure the safety of the pedestrian.

The related art of the present invention is disclosed in Korean Patent Publication No. 2012-0072020 published on Jul. 3, 2012 and entitled "driving information recognition method and apparatus for autonomous system".

SUMMARY OF THE INVENTION

Embodiments of the present invention are directed to a lighting apparatus of an autonomous vehicle, which can enable a pedestrian and another vehicle to recognize a driving status of the autonomous vehicle.

In one embodiment, a lighting apparatus of an autonomous vehicle may include: a roof formed at the top of a vehicle; a lighting unit installed on the roof, and configured to display an autonomous driving status of the vehicle to the outside; and a control unit configured to vary a lighting status of the lighting unit according to the autonomous driving status of the vehicle.

The control unit may include: a first lighting mode for controlling the lighting unit to irradiate light in first color when the vehicle autonomously moves; and a second lighting mode for controlling the lighting unit to irradiate light in second color when the vehicle autonomously stops.

The control unit may include a third lighting mode for controlling the lighting unit to irradiate light in a different manner from the first and second lighting modes, when the vehicle is switched from the autonomous stop to the autonomous driving.

In the third lighting mode, the control unit may control the lighting unit to flicker in the first or second color, or sequentially turn on a plurality of light sources installed in the lighting unit.

The control unit may further include a fourth lighting mode for turning off the lighting unit when the autonomous driving mode of the vehicle is canceled.

The lighting unit may be disposed at the front left end, front right end, rear left end and rear right end of the roof to secure visibility in all directions.

The lighting unit may include an extended lighting unit formed at one or more of the front, rear, left side and right side of the roof so as to be extended in a horizontal direction.

The lighting unit may be disposed at a height of 1,200 mm or more from the ground.

The lighting apparatus may further include a sensor unit installed on the roof, disposed on the same horizontal or vertical line as the lighting unit, and configured to sense a driving condition or surrounding situation of the vehicle.

The lighting unit may have a lighting region overlapping a monitoring region of the sensor unit.

The sensor unit may include: a plurality of LiDARs (Light Detection And Ranging) installed in multiple directions and configured to detect an object around the vehicle and sense a distance to the object; and a plurality of cameras installed in multiple directions and configured to sense the surrounding situation of the vehicle as images.

The lighting unit may include: a light source; an external lighting lens installed toward the outside of the vehicle; and a beam splitter formed of a transparent material, installed between the light source and the external lighting lens, and configured to induce a part of light irradiated from the light source to the external lighting lens, and induce the other part of the light to the inside of the vehicle.

The external lighting lens may include: an outer lens exposed to the outside of the vehicle; and an inner lens installed between the outer lens and the beam splitter.

The external lighting lens may include a color lens configured to color light having passed through the beam splitter in preset color.

The external lighting lens may be disposed facing the light source, with the beam splitter interposed therebetween.

The beam splitter may include: a lighting curtain part formed of a glass material, wherein the light irradiated from the light source is incident on the lighting curtain part; an exterior light output part formed at a portion of the lighting curtain part, the portion facing the external lighting lens, wherein a part of the light incident on the lighting curtain part is outputted through the exterior light output part; and an interior light output part formed at a portion of the lighting curtain part, the portion facing the inside of the vehicle, wherein the other part of the light incident on the lighting curtain part is outputted through the interior light output part.

The interior light output part may include a light output groove formed at the surface of the lighting curtain part such that light which is totally reflected in the lighting curtain part is outputted to the outside of the lighting curtain part.

In accordance with the embodiment of the present invention, the lighting apparatus of the autonomous vehicle may implement the operation of varying the lighting status of the lighting unit installed on the roof according to the autonomous driving status of the vehicle. Thus, a pedestrian and another vehicle around the autonomous vehicle can easily recognize the driving status of the autonomous vehicle, and the operation stability of the autonomous vehicle can be further improved.

DESCRIPTION OF SPECIFIC EMBODIMENTS

Hereafter, a lighting apparatus of an autonomous vehicle in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
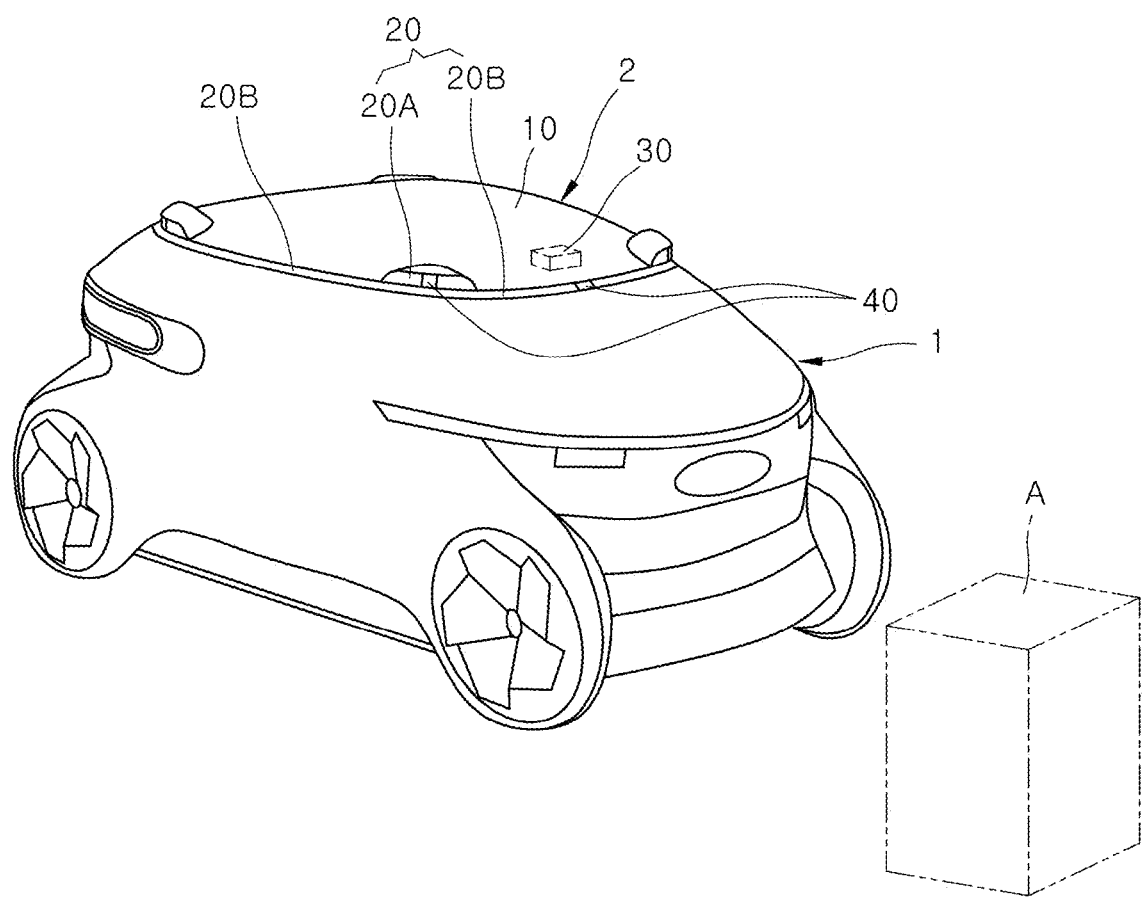
FIG. 1 schematically illustrates an installation state of a vehicle to which a lighting apparatus of an autonomous vehicle in accordance with an embodiment of the present invention is applied.
Figure 2:
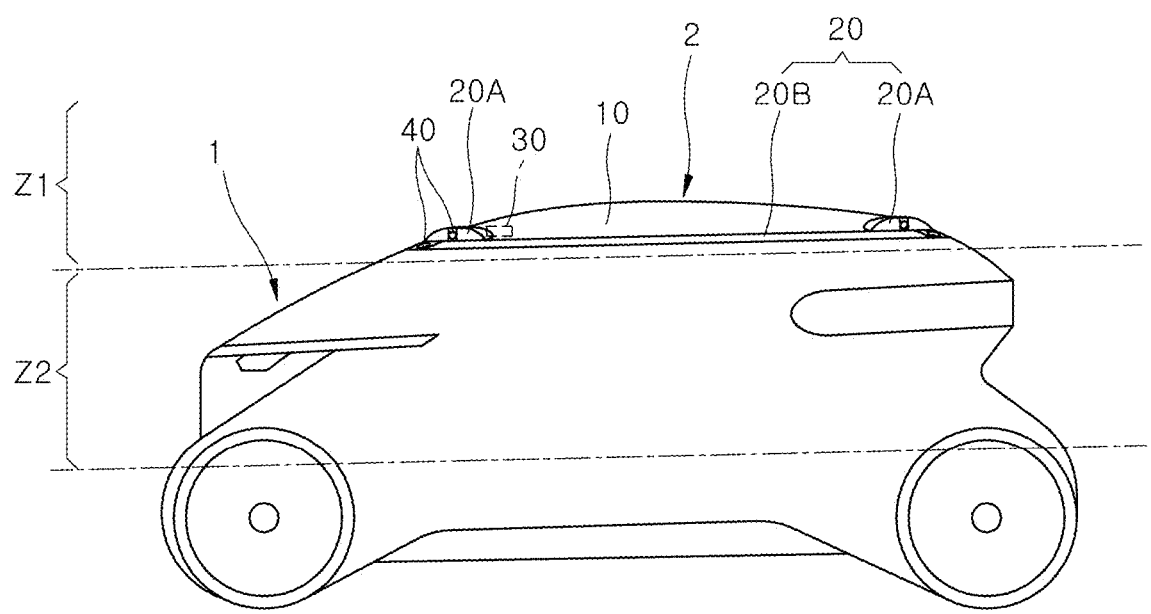
FIG. 2 is a side view schematically illustrating the vehicle to which the lighting apparatus of the autonomous vehicle in accordance with the embodiment of the present invention is applied.

FIG. 1 schematically illustrates an installation state of a vehicle to which a lighting apparatus of an autonomous vehicle in accordance with an embodiment of the present invention is applied, and FIG. 2 is a side view schematically illustrating the vehicle to which the lighting apparatus of the autonomous vehicle in accordance with the embodiment of the present invention is applied.

Referring to FIGS. 1 and 2, a lighting apparatus 2 of a vehicle 1 in accordance with an embodiment of the present invention may include a roof 10, a lighting unit 20, a control unit 30 and a sensor unit 40.

The roof 10 may constitute the top of the vehicle 1. The roof 10 may be formed of an opaque material such as a metallic material or a transparent material such as a glass material. The roof 10 may have a cover shape capable of blocking the inside of the vehicle 1 from the outside, and have a frame shape in which the lighting unit 20 can be installed.

The lighting unit 20 for displaying an autonomous driving status of the vehicle 1 as light to the outside of the vehicle 1 may be installed on the roof 10, and generate and emit light to the outside of the vehicle 1. The lighting unit 20 may statically irradiate different colors of light or three-dimensionally and dynamically irradiate different colors of light through lighting, flickering or turn-off, depending on the driving status of the vehicle 1. For example, the driving status of the vehicle 1 may indicate that the vehicle 1 autonomously moves, autonomously stops or switches from the autonomous stop to the autonomous driving, or the autonomous driving mode is canceled.

Referring to FIG. 2, the lighting of the vehicle 1 may be installed in various manners across an indication lighting zone Z1 and a communication lighting zone Z2. The indication lighting zone Z1 may be formed at a height of 1,200 mm or more from the ground, and the communication lighting zone Z2 may be formed at a height of more than 550 mm to less than 1,200 mm.

That is, the communication lighting zone Z2 may be formed under the indication lighting zone Z1.

The roof 10 may be disposed at the top of the vehicle 1 so as to belong to the indication lighting zone Z1, and the lighting unit 20 in accordance with the embodiment of the present invention may be coupled to the roof 10, and irradiate light on the indication lighting zone Z1 such that a pedestrian can recognize the lighting unit 20 at a long distance of 60 m or more from the vehicle 1. At this time, the lighting unit 20 may have a basic light intensity corresponding to a DRL (Daytime Running Light).

The roof 10 constituting the top of the vehicle 1 may include a closed structure or open structure as long as the structure constitutes at least a part of the top of the vehicle 1, but is not limited to a specific structure and shape. The roof 10 may collectively indicate upper structures of the vehicle, which are positioned at a height of 1,200 mm from the ground, regardless of the size and height of the vehicle.

Figure 3:
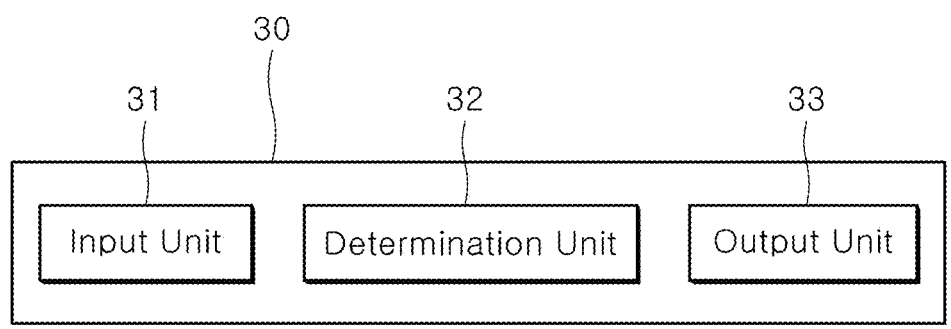
FIG. 3 is a detailed composition drawing of control unit in accordance with the embodiment of the present invention.

FIG. 3 is a detailed composition drawing of control unit in accordance with the embodiment of the present invention.

The control unit 30 may variably control the lighting status of the lighting unit 20 depending on the autonomous driving status of the vehicle 1. Referring to FIG. 3, the control unit 30 may include an input unit 31, a determination unit 32 and an output unit 33. The input unit 31 may receive information on the driving status of the vehicle in real time, the determination unit 32 may determine a lighting mode according to the information received from the input unit 31, and the output unit 33 may generate different signals for the lighting unit 20 depending on the determination of the determination unit 32.

More specifically, when the vehicle 1 autonomously moves, the control unit 30 may use a first lighting mode that controls the lighting unit 20 to irradiate blue-green light in consideration of visibility in both of the day and night. Furthermore, when the vehicle 1 autonomously stops to allow a pedestrian to cross a crosswalk or general road, the control unit 30 may use a second lighting mode that controls the lighting unit 20 to irradiate green light.

When the vehicle 1 is switched from the autonomous stop to the autonomous driving or the vehicle 1 starts after the autonomous stop, the control unit 30 may use a third lighting mode that controls the lighting unit 20 to irradiate differently from in the first and second lighting modes. In the third lighting mode, the control unit 30 may control the lighting unit 20 to flicker a plurality of times (for example, two times) or sequentially turn on a plurality of light sources 21 installed in the lighting unit 20, during a process of turning on the lighting unit 20 to irradiate blue-green light.

When the autonomous driving mode of the vehicle 1 is canceled, the control unit 30 may use a fourth lighting mode that turns off the lighting unit 20. In the fourth lighting mode, a driver may drive the vehicle 1 for himself, and the lighting unit 20 installed on the roof 10 of the vehicle 1 may be turned off. In this case, the autonomous vehicle may operate a lighting system to which the same vehicle-related regulations as a general manual vehicle are applied.

In accordance with the embodiment of the present invention, the lighting unit 20 may irradiate green or blue light at a light intensity corresponding to the DRL on the indication lighting zone Z1, the green or blue light having higher visibility than different colors. Thus, a pedestrian or another vehicle around the vehicle 1 can easily recognize the lighting unit 20, i.e. the autonomous driving status of the vehicle 1 even at a long distance of 60 m or more from the vehicle 1. For reference, lightings for irradiating RGB (Red Green Blue) light may be disposed on the communication lighting zone Z2, such that different operation information of the vehicle may be displayed to a pedestrian or another vehicle positioned at a short distance of 15 m or less from the vehicle 1.

The sensor unit 40 for sensing traveling conditions or surrounding conditions of the vehicle may be installed on the roof 10 installed at the top of the vehicle 1, in order to more stably secure and expand a sensing region. The sensor unit 40 may be an essential component for implementing the autonomous driving, and the operable autonomous driving levels of the vehicle 1 may differ depending on the specification and number of sensor units 40. The sensor unit 40 may include a LiDAR (Light Detection And Ranging) 41, a camera 42, a radar, an ultrasonic sensor and the like.

A plurality of LiDARs 41 may be installed in multiple directions in order to detect an object A around the vehicle 1 and to sense a distance from the object A. For example, the LiDARs 41 may be disposed at five places including four places corresponding to the front left end, the front right end, the rear left end and the rear right end (hereafter, referred to as 'corners') of the roof 10 and one place corresponding to the front center, in order to secure a sensing region across the 360-degree area around the vehicle 1. A plurality of cameras 42 may be installed in multiple directions to sense the surrounding conditions of the vehicle 1 as images. For example, 11 cameras 42 may be installed on the roof 10.

The sensor units 40 may be disposed adjacent to each other on the same horizontal line as the lighting unit 20, or stacked on the same vertical line, thereby implementing the autonomous driving level 4 or more. In particular, the sensor units 40 may be disposed on the same horizontal line and vertical line as the lighting unit 20, while sharing at least a part of the space in which the lighting unit 20 is installed. The lighting unit 20 may have a hollow portion B formed therein, and the sensor units 40 may be disposed in the hollow portion B of the lighting unit 20. Thus, the installation of the sensor units 40 and the lighting unit 20 may be efficiently performed in terms of the space.

According to such arrangement structures, the monitoring region of the sensor unit 40 and the lighting region of the lighting unit 20 may overlap each other. The LiDAR 41 may three-dimensionally image the surrounding environment through a laser scanning scheme using light, and the camera 42 may visibly acquire information on the surrounding environment in the form of an image. The sensitivities and image qualities of the LiDAR 41 and the camera 42 may be affected by brightness, and the use of the LiDAR 41 and the camera 42 may be performed efficiently in terms of energy, with illumination increased by the light irradiated by the lighting unit 20.

Figure 4:
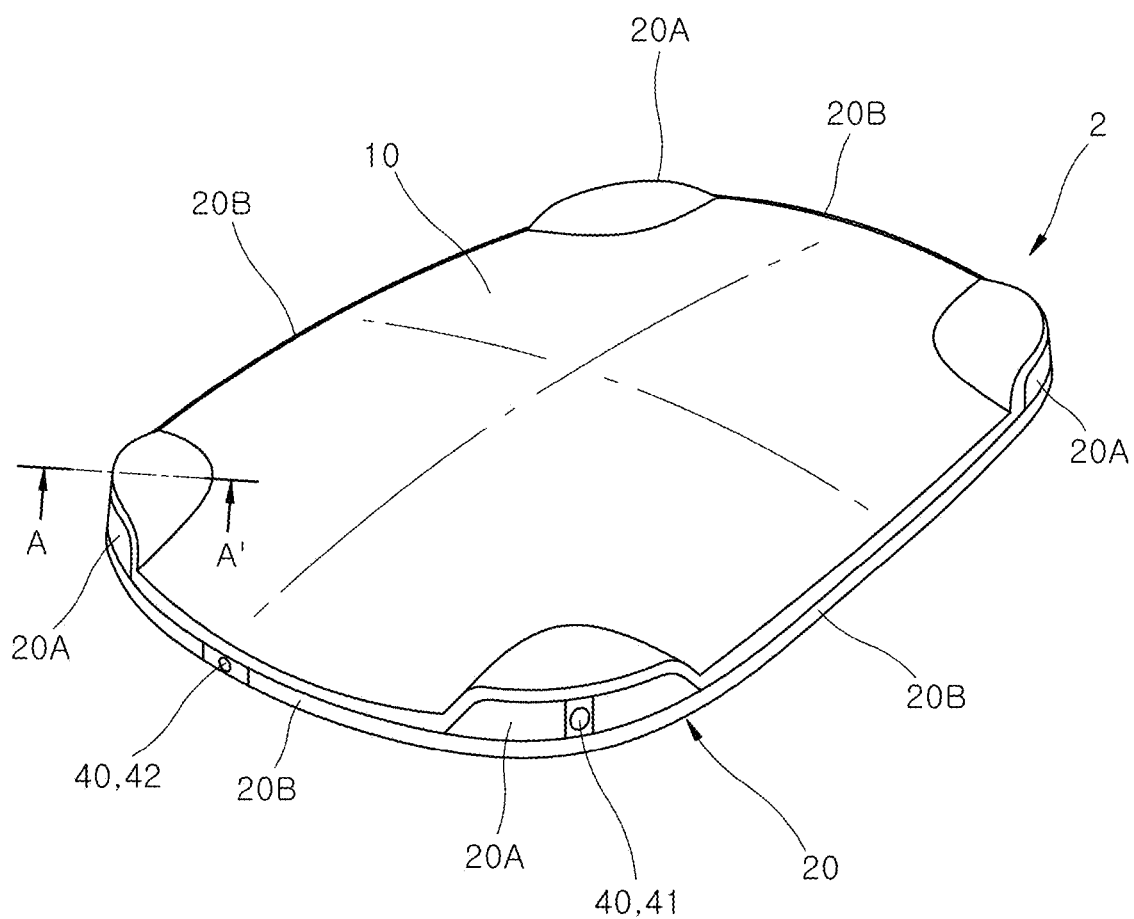
FIG. 4 is a perspective view schematically illustrating the lighting apparatus of the autonomous vehicle in accordance with the embodiment of the present invention.

FIG. 4 is a perspective view schematically illustrating the lighting apparatus of the autonomous vehicle in accordance with the embodiment of the present invention.

Referring to FIG. 4, the lighting unit 20 in accordance with the embodiment of the present invention may include a corner lighting unit 20A and an extended lighting unit 20B.

The corner lighting unit 20A may be disposed at four corners of the roof 10, corresponding to the front left end, the front right end, the rear left end and the rear right end of the roof 10, and thus secure visibility in 360-degree direction. The extended lighting unit 20B may be formed at the front, rear, left side and right side of the roof 10 so as to be extended in the horizontal direction, and thus secure visibility in 360-degree direction.

The visibility may be secured in 360-degree direction only through each of the corner lighting unit 20A and the extended lighting unit 20B. However, when the extended lighting unit 20B is extended in the horizontal direction between the corner lighting units 20A, the visibility can be secured more clearly in 360-degree direction. Furthermore, when the third lighting mode or the like is implemented, various types of lighting statuses such as flickering and sequential turn-on can be implemented.

Figure 5:
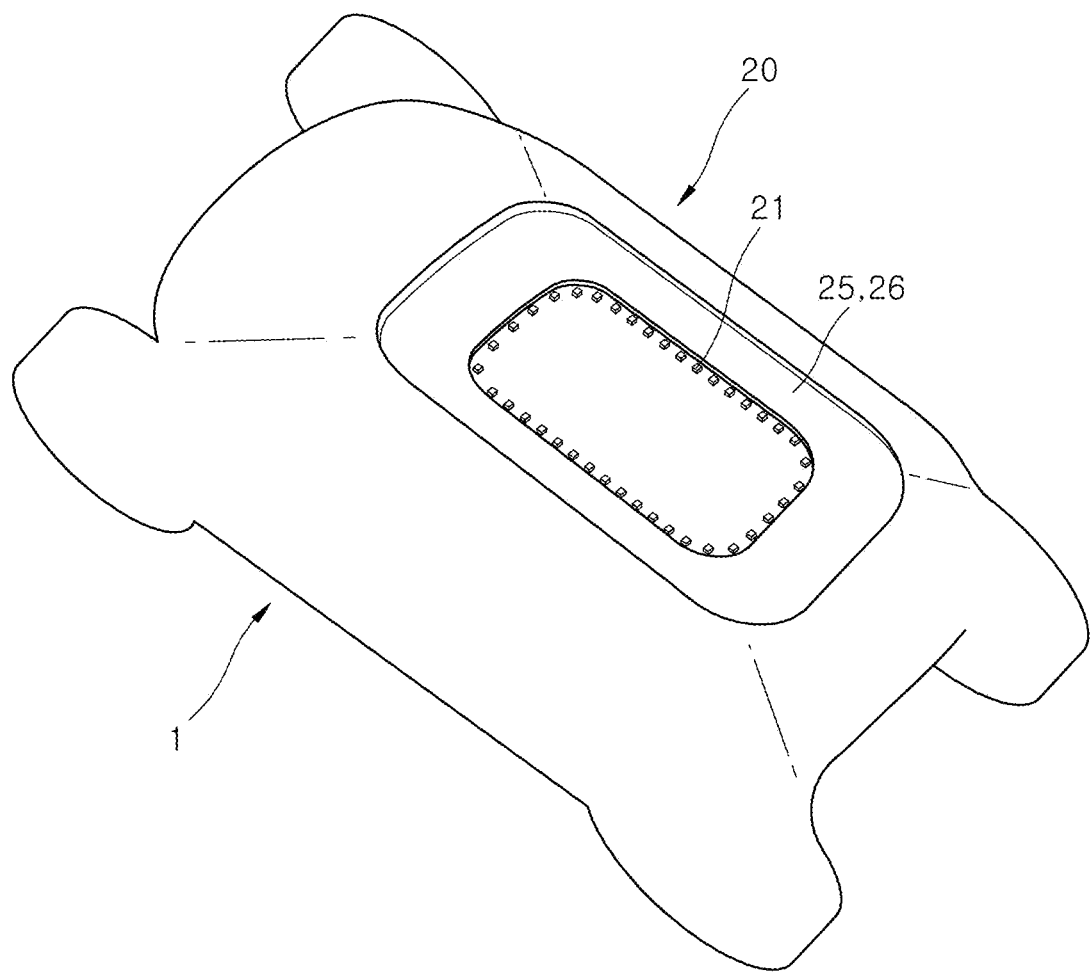
FIG. 5 illustrates an installation state of the vehicle to which the lighting apparatus of the autonomous vehicle in accordance with the embodiment of the present invention is applied, with no roof illustrated therein.
Figure 6:
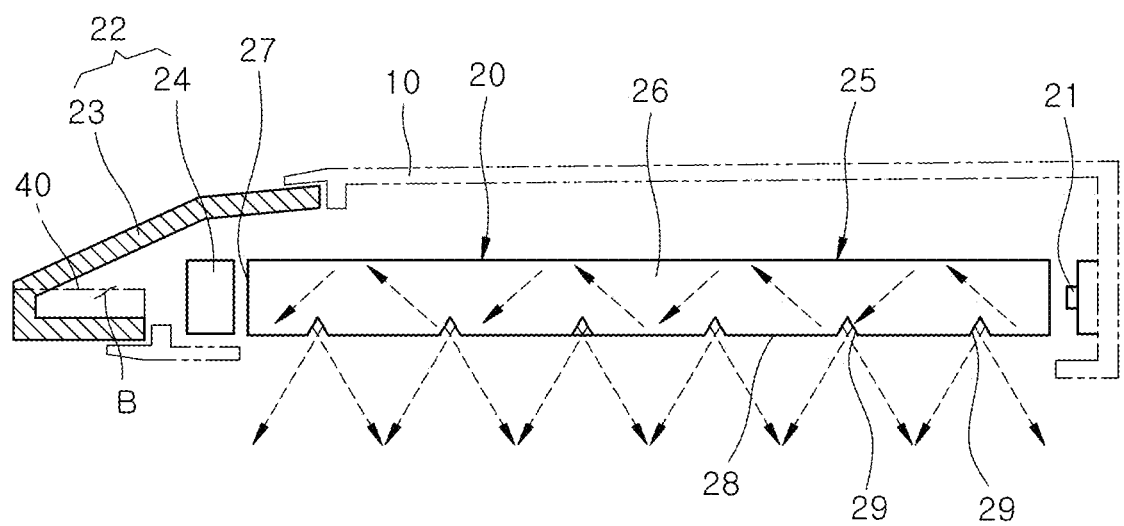
FIG. 6 is a cross-sectional view taken along the line A-A' of FIG. 4.

FIG. 5 illustrates the vehicle to which the lighting apparatus of the autonomous vehicle in accordance with the embodiment of the present invention is applied, with no roof illustrated therein, and FIG. 6 is a cross-sectional view taken along the line A-A' of FIG. 4.

Referring to FIGS. 5 to 6, the lighting unit 20 in accordance with the embodiment of the present invention may include a light source 21, an external lighting lens 22 and a beam splitter 25.

The light source 21 may be fixed at a constant position on the roof 10. At this time, a plurality of light sources 21 may be disposed at four places corresponding to the corners of the roof 10 so as to constitute the corner lighting unit 20A, and successively disposed along the edge of the roof 10 at preset intervals so as to constitute the extended lighting unit 20B. A lighting device such as an LED to emit light may be applied as the light source 21.

The external lighting lens 22 for irradiating light to the outside of the vehicle 1 may be installed to face the outside of the vehicle 1. The external lighting lens 22 in accordance with the embodiment of the present invention may include an outer lens 23 and an inner lens 24. The outer lens 23 constituting the exterior of the vehicle 1 may be installed on the roof 10 so as to be exposed to the outside of the vehicle 1.

The inner lens 24 may be installed between the outer lens 23 and the beam splitter 25. A part of light having passed through the beam splitter 25 may pass through the inner lens 24, and the light having passed through the inner lens 24 may be irradiated in preset color to the outside of the vehicle 1 through the outer lens 23.

The inner lens 24 may include a color lens which colors the light having passed through the beam splitter 25 in preset color. For example, when the light source 21 irradiates white light, a green or blue lens may be applied as the inner lens 24 to create green or blue light. The sensor unit 40 may be installed in a hollow portion B formed between the inner lens 24 and the outer lens 23 or a hollow portion B formed between the beam splitter 25 and the outer lens 23.

The beam splitter 25 may receive the light irradiated from the light source 21, induce a part of the light to the external lighting lens 22, and induce another part of the light to the inside of the vehicle 1. The beam splitter 25 may be formed of a light transmitting material, and installed between the light source 21 and the external lighting lens 22. The beam splitter 25 in accordance with the embodiment of the present invention may include a lighting curtain part 26, an exterior light output part 27 and an interior light output part 28.

The lighting curtain part 26 may be formed of a plate-shaped glass member, and disposed between the light source 21 and the inner lens 24. Referring to FIG. 5, the lighting curtain part 26 may be formed of one glass plate material having a frame shape corresponding to the edge of the roof 10. The plurality of light sources 21 may be arranged along the inner edge of the lighting curtain part 26 at preset intervals.

According to the shape of the lighting curtain part 26 and the arrangement structure of the light sources 21, the plurality of light sources 21 and the lighting curtain part 26 may be reliably assembled and arranged with a preset interval provided therebetween. Therefore, an intended light color, light intensity and light shape can be stably implemented in all directions, and the light irradiated from the light sources 21 arranged in the lighting curtain part 26 inevitably passes through the lighting curtain part 26, which makes it possible to minimize a light loss.

The inner lens 24 may be disposed facing the light source 21, with the beam splitter 25 interposed therebetween. The light irradiated from the light source 21 may be incident on one end of the lighting curtain part 26 in the horizontal direction, and propagate toward the inner lens 24 positioned at the other end of the lighting curtain part 26 in the horizontal direction while passing through the inside of the lighting curtain part 26.

The light incident on the lighting curtain part 26 may be outputted toward the outside of the vehicle 1 through the exterior light output part 27, and the exterior light output part 27 may be formed at the other end of the lighting curtain part 26 in the horizontal direction, which faces the inner lens 24. The light incident on the lighting curtain part 26 may go straight to the exterior light output part 27, and propagate toward the exterior light output part 27 while being repeatedly totally reflected with an angle. The light emitted through the exterior light output part 27 may sequentially pass through the inner lens 24 and the outer lens 23 so as to be irradiated to the outside of the vehicle 1.

The interior light output part 28 may be formed at the bottom of the lighting curtain part 26, facing the inside of the vehicle 1, and a part of the light incident on the lighting curtain part 26 may be outputted through the interior light output part 28. The interior light output part 28 may have light output grooves 29 formed at the surface of the lighting curtain part 26, such that the light which is being totally reflected in the lighting curtain part 26 can be outputted to the outside of the lighting curtain part 26.

The light which is being totally reflected in the lighting curtain part 26 may not be totally reflected when meeting the light output groove 29 having an inclination angle, instead of the flat reflecting surface, but outputted to the outside of the lighting curtain part 26 through the surface of the light output groove 29. By increasing or decreasing the number of the light output grooves 29, it is possible to increase or decrease the area of the interior light output part 28 or the amount of light outputted to the inside of the vehicle 1 in proportion to the number of the light output grooves 29.

In accordance with the embodiment of the present invention, the lighting apparatus 2 of the autonomous vehicle 1 may implement the operation of varying the lighting status of the lighting unit 20 installed in the roof 10 according to the autonomous driving status of the vehicle 1. Thus, a pedestrian and another vehicle around the autonomous vehicle 1 can easily recognize the driving status of the autonomous vehicle 1, and the operation stability of the autonomous vehicle 1 can be further improved.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A lighting apparatus of an autonomous vehicle, comprising:
   a roof formed at a top of a vehicle;
   an extended-around lighting unit installed under a roof wall of on the roof, and configured to display an autonomous driving status of the vehicle; and
   a control unit configured to vary a lighting status of the extended-around lighting unit based on the autonomous driving status of the vehicle,
   wherein the extended-around lighting unit comprises:
     an external light output lens disposed between a sidewall of the vehicle and a periphery of the roof wall and extending around the vehicle along the periphery of the roof wall;
     a plurality of light sources configured to emit light beams, the plurality of light sources being disposed inwardly from the external light output lens, the plurality of light sources being arranged along the external light output lens; and
     a beam splitter comprising a ring-shaped body extending along the external light output lens to surround the plurality of light sources, the beam splitter being located between the external light output lens and the plurality of light sources to guide light beams emitted from the plurality of light sources toward the external light output lens,
   wherein the light beams are emitted from the plurality of light sources, transmitted through the beam splitter and output through the external light output lens extending around the vehicle such that the light beams emitted from the extended-around lighting unit are visible from any direction outside the vehicle.

2. The lighting apparatus of claim 1, wherein the control unit configured to:
   in a first lighting mode, control the lighting unit to irradiate light in first color when the vehicle autonomously moves; and
   in a second lighting mode, control the lighting unit to irradiate light in second color when the vehicle autonomously stops.

3. The lighting apparatus of claim 2, wherein the control unit is configured to, in a third lighting mode, control the lighting unit to irradiate light in a different manner from the first and second lighting modes, when the vehicle is switched from the autonomous stop to the autonomous driving.

4. The lighting apparatus of claim 3, wherein in the third lighting mode, the control unit is configured to control the lighting unit to flicker in the first or second color, or sequentially turn on the plurality of light sources installed in the lighting unit.

5. The lighting apparatus of claim 2, wherein the control unit is configured to, in a fourth lighting mode, turn off the lighting unit when an autonomous driving mode of the vehicle is canceled.

6. The lighting apparatus of claim 1, wherein the lighting unit is disposed at a height of 1,200 millimeters or more from a ground.

7. The lighting apparatus of claim 1, further comprising a sensor unit disposed on a same horizontal or vertical line as the lighting unit, and configured to sense a driving condition or surrounding situation of the vehicle.

8. The lighting apparatus of claim 7, wherein the lighting unit has a lighting region overlapping a monitoring region of the sensor unit.

9. The lighting apparatus of claim 7, wherein the sensor unit comprises:
- a plurality of LiDARs (Light Detection And Ranging) installed in multiple directions and configured to detect an object around the vehicle and sense a distance to the object; and
- a plurality of cameras installed in multiple directions and configured to sense the surrounding situation of the vehicle as images.

10. The lighting apparatus of claim 1, wherein the beam splitter is formed of a transparent material, and configured to induce portions of light beams incident from the plurality of light sources source to the external light output lens, and induce portions of the light beams incident from the plurality of light sources to an inside of the vehicle.

11. The lighting apparatus of claim 10, further comprising:
- an inner lens installed between the external light output outer lens and the beam splitter.

12. The lighting apparatus of claim 10, wherein the external light output lens comprises a color lens.

13. The lighting apparatus of claim 1, wherein the beam splitter comprises:
- an incidence surface facing the plurality of light sources;
- an emitting surface facing the external light output lens;
- a top surface configured to reflect the light beams;
- a bottom surface opposite to the top surface; and
- a plurality of light output grooves formed on the bottom surface and configured to emit portions of the light beams inside the vehicle.

\* \* \* \* \*